United States Patent
Tachibana et al.

(10) Patent No.: US 10,424,329 B2
(45) Date of Patent: Sep. 24, 2019

(54) MAGNETIC RECORDING MEDIUM

(71) Applicant: Sony Corporation, Tokyo (JP)

(72) Inventors: Junichi Tachibana, Miyagi (JP);
Noboru Sekiguchi, Miyagi (JP); Tomoe Ozaki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/208,932

(22) Filed: Jul. 13, 2016

(65) Prior Publication Data

US 2017/0069343 A1 Mar. 9, 2017

Related U.S. Application Data

(63) Continuation of application No. 14/289,762, filed on May 29, 2014, now abandoned.

(30) Foreign Application Priority Data

Jun. 5, 2013 (JP) ................ 2013-119187

(51) Int. Cl.
*G11B 5/66* (2006.01)
*G11B 5/65* (2006.01)
*G11B 5/73* (2006.01)
*G11B 5/64* (2006.01)
*G11B 5/78* (2006.01)

(52) U.S. Cl.
CPC ........... *G11B 5/656* (2013.01); *G11B 5/64* (2013.01); *G11B 5/65* (2013.01); *G11B 5/732* (2013.01); *G11B 5/7315* (2013.01); *G11B 5/78* (2013.01)

(58) Field of Classification Search
CPC ....... G11B 5/667; G11B 5/732; G11B 5/7325; G11B 5/8404
See application file for complete search history.

(56) References Cited

U.S. PATENT DOCUMENTS

| 5,700,593 A | * | 12/1997 | Okumura | ............... | G11B 5/656 |
| | | | | | 428/336 |
| 2004/0000374 A1 | * | 1/2004 | Watanabe | .............. | G11B 5/667 |
| | | | | | 428/832 |
| 2005/0255337 A1 | | 11/2005 | Mukai | | |
| 2006/0057430 A1 | | 3/2006 | Kuboki | | |

(Continued)

FOREIGN PATENT DOCUMENTS

| JP | 2005-196885 A | 7/2005 |
| JP | 2009-015959 A | 1/2009 |
| JP | 2009-059431 A | 3/2009 |

*Primary Examiner* — Holly C Rickman
*Assistant Examiner* — Linda N Chau
(74) *Attorney, Agent, or Firm* — Wolf, Greenfield & Sacks, P.C.

(57) ABSTRACT

A magnetic recording medium includes a substrate, a seed layer, an under layer, and a perpendicular recording layer having a granular structure. $(Ms \cdot \alpha \delta^{1.5}(1-Rs)^{0.33})$, Ms, and $\alpha$ satisfy $(Ms \cdot \alpha \cdot \delta^{1.5}(1-Rs)^{0.33}) \leq 0.1$ [$\mu \cdot emu \cdot (mm)^{-1.5}$], $Ms \geq 450$ [emu/cc], and $\alpha \geq 1.2$. In the above formulas, Ms indicates a saturated magnetization amount, $\alpha$ indicates the gradient of a M-H loop around a coercive force Hc, $\delta$ indicates the thickness of the perpendicular recording layer, and Rs indicates a squareness ratio.

15 Claims, 3 Drawing Sheets

(56) References Cited

U.S. PATENT DOCUMENTS

| | | |
|---|---|---|
| 2008/0199733 A1 | 8/2008 | Oka |
| 2009/0296278 A1* | 12/2009 | Inamura ................ B82Y 10/00 360/135 |
| 2010/0323222 A1 | 12/2010 | Nakashio et al. |
| 2011/0111257 A1 | 5/2011 | Kurokawa |
| 2014/0329112 A1 | 11/2014 | Aizawa |
| 2014/0342189 A1 | 11/2014 | Tachibana et al. |
| 2014/0363700 A1 | 12/2014 | Tachibana et al. |
| 2015/0111066 A1 | 4/2015 | Terakawa et al. |
| 2016/0099018 A1 | 4/2016 | Aizawa |

* cited by examiner

MAGNETIC RECORDING MEDIUM

CROSS REFERENCE TO RELATED APPLICATIONS

This application is a continuation of U.S. application Ser. No. 14/289,762, filed May 29, 2014, which claims the benefit of Japanese Priority Patent Application JP 2013-119187 filed Jun. 5, 2013, the entire contents of each of which are incorporated herein by reference.

BACKGROUND

The present technology relates to a magnetic recording medium. In more particular, the present technology relates to a magnetic recording medium including a seed layer.

In recent years, a coating type magnetic recording medium in which a magnetic powder is applied on a non-magnetic support has become the mainstream of magnetic recording media for data storage. In order to increase the recording capacity per one cartridge, it is necessary to improve a surface recording density using a finely pulverized magnetic powder; however, according to a currently used coating method, a thin film is difficult to form using fine grains having a diameter of 10 nm or less.

Accordingly, a magnetic recording medium has been proposed in which a film of a CoCrPt-based metal material having a high magnetic anisotropy is formed on a flexible substrate, for example, by a sputtering method, and in addition, this material is crystallized and oriented in a direction perpendicular to the surface of the substrate. As for this magnetic recording medium, it has been desired to improve the magnetic characteristics by improvement of the orientation of a magnetic recording layer, and hence, various techniques to satisfy this desire have been studied in recent years. For example, according to Japanese Unexamined Patent Application Publication No. 2005-196885, as one of the above techniques, there has been disclosed a magnetic recording medium in which an amorphous layer, a seed layer, an under layer, a magnetic layer, and a protective layer are at least sequentially laminated on a substrate. In addition, the above technique has also disclosed that the seed layer is formed from one of Ti, Cr, Mo, W, Zr, a Ti alloy, a Cr alloy, and a Zr alloy, the under layer is formed from Ru, and the magnetic layer is formed to have a granular structure.

SUMMARY

It is desirable to provide a magnetic recording medium having an excellent signal-noise ratio (SNR).

In order to achieve the above desire, according to an embodiment of the present technology, there is provided a magnetic recording medium which includes a substrate, a seed layer, an under layer, and a perpendicular recording layer having a granular structure and in which $(Ms \cdot \alpha \cdot \delta^{1.5}(1-Rs)^{0.33})$, Ms, and $\alpha$ satisfy the following relations.

$$(Ms \cdot \alpha \cdot \delta^{1.5}(1-Rs)^{0.33}) \leq 0.1 \ [\mu \cdot emu \cdot (mm)^{-1.5}]$$

$$Ms \geq 450 \ [emu/cc]$$

$$\alpha \geq 1.2$$

(In the above formulas, Ms indicates a saturated magnetization amount, $\alpha$ indicates the gradient of a M-H loop around a coercive force Hc, $\delta$ indicates the thickness of the perpendicular recording layer, and Rs indicates a squareness ratio.)

As described above, according to an embodiment of the present technology, a magnetic recording medium having an excellent SNR can be provided.

DETAILED DESCRIPTION OF EMBODIMENTS

According to an embodiment of the present technology, a seed layer, an under layer, and a recording layer may have either a single-layer structure or a multilayer structure. In order to further improve magnetic characteristics and/or recording/reproducing characteristics of a magnetic recording medium, a layer having a multilayer structure is preferably employed. In consideration of manufacturing efficiency, among the multilayer structures, a double-layer structure is preferably employed.

In addition, in the present technology, the term "comprising" encompasses more restrictive terms "consisting essentially of" and "consisting of".

Embodiments of the present technology will be described in the following order.

1. Structure of Magnetic Recording Medium
2. Structure of Sputtering Apparatus
3. Method for Manufacturing Magnetic Recording Medium
4. Effects
5. Modified Example

1. Structure of Magnetic Recording Medium

Figure 1:
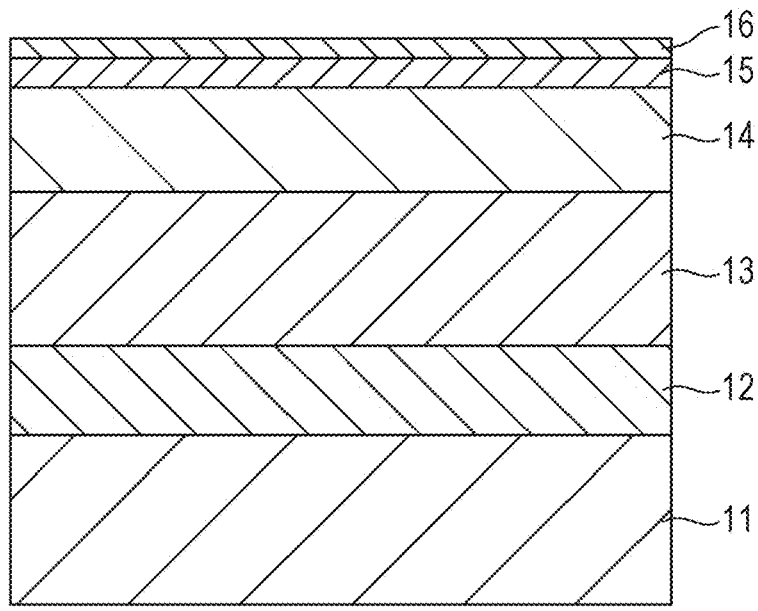
FIG. 1 is a schematic cross-sectional view showing one example of the structure of a magnetic recording medium according to an embodiment of the present technology.

FIG. 1 is a cross-sectional view schematically showing one example of the structure of a magnetic recording medium according to an embodiment of the present technology. The magnetic recording medium according to this embodiment is a so-called single-layer perpendicular magnetic recording medium, and as shown in FIG. 1, this magnetic recording medium includes a substrate 11, a seed layer 12 provided on the surface of the substrate 11, an under layer 13 provided on the surface of the seed layer 12, a magnetic recording layer 14 provided on the surface of the under layer 13, a protective layer 15 provided on the surface of the magnetic recording layer 14, and a top coat layer 16 provided on the surface of the protective layer 15. The magnetic recording medium of this embodiment is a magnetic recording medium which can record an information signal by a ring type head or the like. In addition, in this specification, a magnetic recording medium having no soft magnetic lining layer is called a "single-layer perpendicular magnetic recording medium", and a magnetic recording medium having a soft magnetic lining layer is called a "double-layer perpendicular magnetic recording medium".

This magnetic recording medium is suitably used as a data archive-purpose storage medium which is expected to be increasingly in demand from now on. This magnetic recording medium is able to realize 10 times or more the surface recording density of a current storage-purpose coating type magnetic recording medium, that is, to realize a surface recording density of 50 Gb/in$^2$. When a common linear recording type data cartridge is formed using a magnetic recording medium having the surface recording density as described above, a large capacity recording of 50 TB or more per one data cartridge can be realized.

According to an embodiment of the present technology, the following formula F(Ms, α, δ, Rs) is defined (Reference Literature: N. Honda et. al., J. Magn. Soc. Japan, vol. 21(S2), pp. 505 to 508, 1997).

$$F(Ms,\alpha,\delta,Rs)=(Ms\cdot\alpha\cdot\delta^{1.5}(1-Rs)^{0.33})[\mu\cdot emu\cdot(mm)^{-1.5}]$$

(In the above formula, Ms indicates a saturated magnetization amount, α indicates the gradient of a M-H loop around a coercive force Hc, δ indicates the thickness of the perpendicular recording layer 14, and Rs indicates a squareness ratio.) Furthermore, according to an embodiment of the present technology, the following formula f(Ku, V, T) is also defined.

$$f(Ku,V,T)=(Ku\cdot V/k_B\cdot T)$$

(In the above formula, Ku indicates magnetic anisotropic energy, V indicates an activation volume, $k_B$ indicates Boltzmann constant, and T indicates the absolute temperature.)

In the magnetic recording medium of this embodiment, the formula F(Ms, α, δ, Rs), the saturated magnetization amount Ms, and the gradient α of a M-H loop around a coercive force Hc satisfy the following relations. When those relations are satisfied, a magnetic recording medium having an excellent SNR can be realized.

$$F(Ms,\alpha,\delta,Rs)\leq 0.1\ [\mu\cdot emu\cdot(mm)^{-1.5}]$$

$$Ms\geq 450\ [emu/cc]$$

$$\alpha\geq 1.2$$

Hereinafter, the reason the formula F(Ms, α, δ, Rs) is set to satisfy F(Ms, α, δ, Rs)≤0.1 [μ·emu·(mm)$^{-1.5}$] will be described in detail. The value of the formula F mainly relates to a noise output. In a recording density region (such as 50 Gb/in$^2$ or more) conceived in this embodiment, a signal output primarily depends on low spacing and reproducing head sensitivity, and as medium characteristics, low noise characteristics are desired. Hence, in this embodiment, the formula F(Ms, α, δ, Rs) is set to satisfy F(Ms, α, δ, Rs)≤0.1 [μ·emu·(mm)$^{-1.5}$], so that the low noise characteristics of the magnetic recording medium are realized.

Hereinafter, the reason the saturated magnetization amount Ms is set to satisfy Ms≥450 [emu/cc] will be described in detail. Although as the characteristics of the magnetic recording medium, the value of the formula F is preferably decreased as described above so as to realize the low noise characteristics, when the value of the saturated magnetization amount Ms is excessively decreased, a decrease in signal output becomes larger than a decrease in noise output, and as a result, the SNR is also decreased. Hence, in this embodiment, the formula F is first set to satisfy F≤0.1 [μ·emu·(mm)$^{-1.5}$], and the saturated magnetization amount Ms is further set to satisfy Ms≥450 [emu/cc].

Hereinafter, the reason the gradient α is set to satisfy α≥1.2 will be described in detail. The gradient α of a M-H loop around a coercive force Hc is a parameter correlating to exchange interactions between magnetic grains. Accordingly, when α is decreased, since the exchange interactions are decreased, the activation volume, which indicates a volume in the state in which crystalline grains are bonded together by the exchange interactions and magnetic interactions, is decreased, and as a result, the noise is reduced. However, when α is excessively decreased, a large head magnetic field is necessary for saturation recording, and in addition, the magnetization reversal becomes slow; hence, the signal output is decreased, and as a result, the SNR is decreased. Hence, in this embodiment, the gradient α is set to satisfy α≥1.2.

In the magnetic recording medium of this embodiment, while the formula F(Ms, α, δ, Rs), the saturated magnetization amount Ms, and the gradient of α of a M-H loop around a coercive force Hc satisfy the above relations, the formula f(Ku, V, T) preferably further satisfies the following relation. When this relation is satisfied, a magnetic recording medium having not only an excellent SNR but also high stability against thermal disturbance can be realized.

$$f(Ku,V,T)\geq 65$$

Hereinafter, the reason the formula f(Ku, V, t) is set to satisfy f(Ku, V, T)≥65 will be described in detail. Although the size of magnetic grains is preferably decreased in order to realize the reduction in noise, when the size of the magnetic grains is decreased, the influence of thermal disturbance is increased, and as a result, the magnetic state may not be maintained in some cases. In order to sufficiently withstand the influence of thermal disturbance, in general, Ku·V/$k_B$·T is preferably set to satisfy Ku·V/$k_B$·T≥60 to 80. In this embodiment, Ku·V/$k_B$·T is preferably set to satisfy Ku·V/$k_B$·T≥65.

(Substrate)

The substrate 11 used as a support is, for example, a long film. As the substrate 11, a flexible non-magnetic substrate is preferably used. As a material of the non-magnetic substrate, for example, a flexible high molecular weight material which is commonly used for magnetic recording media may be used. As particular examples of the high molecular weight material as described above, for example, there may be mentioned a polyester, a polyolefin, a cellulose derivative, a vinyl-based resin, a polyimide, a polyamide, and a polycarbonate.

(Seed Layer)

The seed layer 12 is provided between the substrate 11 and the under layer 13. The seed layer 12 preferably has an amorphous state and preferably contains a metal having a melting point of 2,000° C. or less. The seed layer 12 may further contain O (oxygen) besides the metal having a melting point of 2,000° C. or less. This oxygen is a very small amount of impurity oxygen trapped in the seed layer 12 when the seed layer 12 is formed, for example, by a sputtering method. In this embodiment, the "seed layer" does not indicate an intermediate layer which has a crystalline structure similar to that of the under layer 13 and which is provided for crystalline growth but indicates an intermediate layer which improves the perpendicular orientation of the under layer 13 by the flatness and the amorphous state of the seed layer 12. The "alloy" indicates, for example, at least one of a solid solution, a eutectic compound, and an intermetallic compound, each of which contains Ti and Cr. The "amorphous state" indicates a state in which a halo pattern is observed by an electron diffraction method, and in which the crystalline structure is difficult to be identified.

The seed layer 12 having an amorphous state and containing a metal having a melting point of 2,000° C. or less not only has a function to suppress the influence of an Oz gas and H₂O adsorbed on and in the substrate 11 but also has a function to improve the perpendicular orientation of the under layer 13 by forming a metal flat surface on the surface of the substrate 11. In addition, when the seed layer 12 is placed in a crystalline state, columnar shapes are clearly formed in association with the crystalline growth, and irregularities of the surface of the substrate 11 are apparently increased. As a result, the crystalline orientation of the under layer 13 is degraded.

The metal having a melting point of 2,000° C. or less may be either a metal element or an alloy. As the metal having a melting point of 2,000° C. or less, for example, at least one element selected from the group consisting of Ti, Cr, Co, Ni, Al, and the like may be mentioned. In more particular, for example, an alloy containing Ti and Cr, an alloy containing Ni and Al, an alloy containing Co and Cr, a Ti element, and the like may be mentioned, and among those mentioned above, an alloy containing Ti and Cr is particularly preferable.

As described above, one purpose of providing the seed layer 12 is to realize the flatness of the substrate surface. When a metal having a low melting point is used as a material of the seed layer 12, or in more particular, when a metal having a melting point of 2,000° C. or less is used, it is estimated that a preferable flat surface can be formed. The correlation between the melting point and the diffusion coefficient of a material has been commonly understood, and when the material has a lower melting point, the diffusion coefficient thereof is increased. The diffusion coefficient of a material has a significant influence on the film growth mechanism, and as the diffusion coefficient is increased, migration on the surface of the substrate 11 is increased; hence, it is believed that the density is increased, and that the flatness of the surface is improved.

When the seed layer 12 contains Ti, Cr, and O (oxygen), the rate of 0 with respect to the total amount of Ti, Cr, and O contained in the seed layer 12 is preferably 15 atomic % (at %) or less and more preferably 10 at % or less. When the rate of oxygen is more than 15 at %, since a $TiO_2$ crystal is generated, crystalline nuclear formation of the under layer 13 formed on the surface of the seed layer 12 is influenced thereby, and the orientation of the under layer 13 is remarkably degraded.

The rate of Ti with respect to the total amount of Ti and Cr contained in the seed layer 12 is preferably 30 to 100 at % and more preferably 50 to 100 at %. When the rate of Ti is less than 30 at %, the (100) plane of a body-centered cubic lattice (bcc) structure of Cr is oriented, and the orientation of the under layer 13 formed on the surface of the seed layer 12 is degraded.

In addition, the rate of the above element can be obtained as described below. After the magnetic recording medium is etched with ion beams from a top coat layer 16 side, analysis of the outermost surface of the etched seed layer 12 is performed by an Auger electron spectroscopy, and the rate of the average atomic number with respect to the thickness is regarded as the rate of the element. In particular, analysis is performed on three elements, Ti, Cr, and O, and the element content represented by a percentage rate is identified.

When an alloy containing Ti and Cr is used as the material of the seed layer 12, the alloy may also contain at least one metal element as an additive element besides Ti and Cr. As this additive element, a metal element having a melting point of 2,000° C. or less is preferable, and for example, at least one element selected from the group consisting of Co, Ni, Al, and the like may be mentioned.

(Under Layer)

The under layer 13 preferably has a crystalline structure similar to that of the magnetic recording layer 14. When the magnetic recording layer 14 contains a Co-based alloy, the under layer 13 preferably contains a material having a hexagonal close-packed (hcp) structure similar to that of the Co-based alloy, and the c axis of this structure is preferably oriented in a direction perpendicular to the film surface (that is, in a film thickness direction). The reasons for this are that the orientation of the magnetic recording layer 14 can be improved, and the matching in lattice constant between the under layer 13 and the magnetic recording layer 14 can be relatively improved. As the material having a hexagonal close-packed (hcp) structure, a material containing Ru is preferably used, and in particular, a Ru element or a Ru alloy is preferable. As the Ru alloy, for example, a Ru alloy oxide, such as Ru—$SiO_2$, Ru—$TiO_2$, Ru—$ZrO_2$, or the like may be mentioned.

(Magnetic Recording Layer)

In order to improve the recording density, the magnetic recording layer 14 is preferably a perpendicular recording layer which contains a Co-based alloy and has a granular structure. This granular magnetic layer is formed of ferromagnetic crystalline grains containing a Co-based alloy and non-magnetic grain boundaries (non-magnetic material) surrounding the ferromagnetic crystalline grains. In more particular, this granular magnetic layer is formed of columns (columnar crystals) containing a Co-based alloy and non-magnetic grain boundaries (oxides such as $SiO_2$) which surround those columns and magnetically separate the columns from each other. By this structure, the magnetic recording layer can be formed so that the columns are magnetically separated from each other.

The Co-based alloy has a hexagonal close-packed (hcp) structure, and the c axis thereof is oriented in a perpendicular direction (film thickness direction) to the film surface. As the Co-based alloy, a CoCrPt-based alloy containing at least Co, Cr, and Pt is preferably used. The CoCrPt-based alloy is not particularly limited, and the CoCrPt-based alloy may further contain at least one additive element. As the additive element, for example, at least one element selected from the group consisting of Ni, Ta, and the like may be mentioned.

The non-magnetic grain boundary surrounding the ferromagnetic crystalline grain contains a non-magnetic metal material. In this embodiment, the metal includes a half metal. As the non-magnetic metal material, for example, either a metal oxide or a metal nitride may be used, and in order to more stably maintain the granular structure, a metal oxide is preferably used. As the metal oxide, for example, a metal oxide containing at least one element selected from the group consisting of Si, Cr, Co, Al, Ti, Ta, Zr, Ce, Y, and Hf may be mentioned, and a metal oxide containing at least a Si oxide (that is, $SiO_2$) is preferable. As particular examples of the metal oxide, for example, $SiO_2$, $Cr_2O_3$, CoO, $Al_2O_3$, $TiO_2$, $Ta_2O_5$, $ZrO_2$, or $HfO_2$ may be mentioned. As the metal nitride, for example, a metal nitride containing at least one element selected from the group consisting of Si, Cr, Co, Al, Ti, Ta, Zr, Ce, Y, and Hf may be mentioned. As particular examples of the metal nitride, for example, SiN, TiN, and AlN may be mentioned. In order to more stably maintain the granular structure, of the metal nitride and the metal oxide, the non-magnetic grain boundary preferably contains the metal oxide.

In order to realize further improvement in SNR, the CoCrPt-based alloy contained in the ferromagnetic crystalline grain and the Si oxide contained in the non-magnetic grain boundary preferably have an average composition represented by the following formula (1). The reason for this is that since a saturated magnetization amount Ms can be realized which suppresses the influence of a demagnetizing field and which can secure a sufficient reproduction output, a high SNR can be secured.

$$(Co_xPt_yCr_{100-x-y})_{100-z}\text{—}(SiO_2)_z \quad (1)$$

(In the formula (1), x, y, and z satisfy $69 \leq x \leq 72$, $12 \leq y \leq 16$, $9 \leq z \leq 12$, respectively.)

In addition, the above composition may be obtained as described below. After the magnetic recording medium is etched with ion beams from a top coat layer 16 side, analysis by an Auger electron spectroscopy is performed on the outermost surface of the magnetic recording layer 14 thus etched, and the rate of the average atomic number with respect to the thickness is regarded as the rate of the element. In particular, the analysis is performed on five elements, Co, Pt, Cr, Si, and O, and the element content represented by a percentage rate is identified.

Although the magnetic recording medium according to this embodiment is a single-layer magnetic recording medium having no lining layer (soft magnetic lining layer) containing a soft magnetic material, in this type of magnetic recording medium, when the influence of the demagnetizing field caused by the magnetic recording layer 14 is large in a perpendicular direction, sufficient recording in a perpendicular direction tends to be difficult to perform. Since the demagnetizing field is increased in proportion to the saturated magnetization amount Ms of the magnetic recording layer 14, in order to suppress the demagnetizing field, the saturated magnetization amount Ms is preferably decreased. However, when the saturated magnetization amount Ms is decreased, a residual magnetization amount Mr is decreased, and as a result, a reproduction output is decreased. Hence, a material contained in the magnetic recording layer 14 is preferably selected so that the influence of the demagnetizing field can be suppressed (that is, the saturated magnetization amount Ms is decreased), and at the same time, a residual magnetization amount Mr which can secure a sufficient reproduction output can be obtained. In the average composition represented by the above formula (1), those characteristics can both be satisfied, and hence, a high SNR can be secured.

(Protective Layer)

The protective layer 15 contains, for example, a carbon material or silicon dioxide ($SiO_2$), and in view of the film strength of the protective layer 15, a carbon material is preferably contained. As the carbon material, for example, there may be mentioned graphite, diamond-like carbon (DLC), diamond, or the like.

(Top Coat Layer)

The top coat layer 16 contains, for example, a lubricant agent. As the lubricant agent, for example, a silicone lubricant agent, a hydrocarbon lubricant agent, a fluorinated hydrocarbon lubricant agent, or the like may be used.

2. Structure of Sputtering Apparatus

Figure 2:
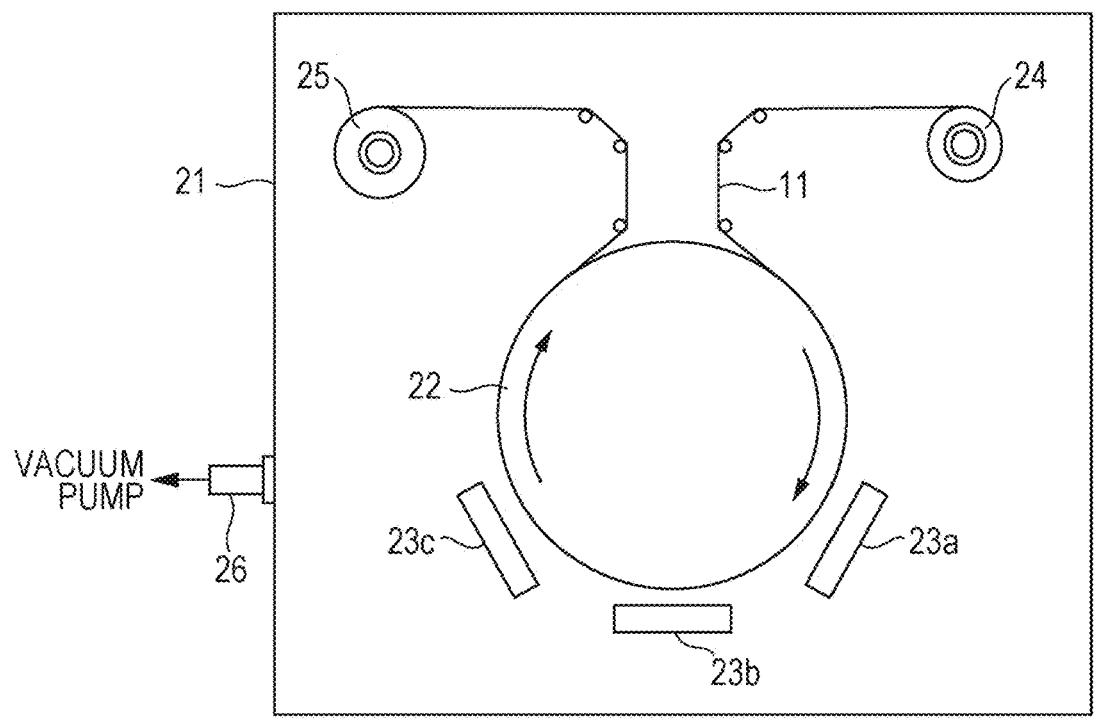
FIG. 2 is a schematic view showing one example of the structure of a sputtering apparatus used for manufacturing a magnetic recording medium according to an embodiment of the present technology.

FIG. 2 is a schematic view showing one example of the structure of a sputtering apparatus used for manufacturing a magnetic recording medium according to an embodiment of the present technology. This sputtering apparatus is a continuous winding type sputtering apparatus used for film formation of the seed layer 12, the under layer 13, and magnetic recording layer 14, and as shown in FIG. 2, the sputtering apparatus includes a film formation chamber 21, a drum 22, cathodes 23a to 23c, a feeding reel 24, and a winding reel 25. Although the sputtering apparatus is, for example, a DC (direct current) magnetron sputtering type apparatus, the sputtering method is not limited to this method.

The film formation chamber 21 is connected to a vacuum pump (not shown) via an exhaust port 26, and by this vacuum pump, the atmosphere inside the film formation chamber 21 is set to a predetermined degree of vacuum. Inside the film formation chamber 21, the rotatable drum 22, the feeding reel 24, and the winding reel 25 are disposed. In sputtering, the substrate 11 which is unwound out of the feeding reel 24 is wound by the winding reel 25 through the drum 22. The drum 22 is provided with a cooling mechanism (not shown) and is cooled, for example, to approximately −20° C. in sputtering. Inside the film formation chamber 21, the cathodes 23a to 23c are disposed to face the cylindrical surface of the drum 22. Targets are set to the respective cathodes 23a to 23c. In particular, the targets which form the seed layer 12, the under layer 13, and the magnetic recording layer 14 are set to the cathodes 23a, 23b, and 23c, respectively. By those cathodes 23a to 23c, a plurality of types of films, that is, the seed layer 12, the under layer 13, and the magnetic recording layer 14, are simultaneously formed.

The atmosphere of the film formation chamber 21 in sputtering is set, for example, to approximately $1 \times 10^{-5}$ to $5 \times 10^{-5}$ Pa. The film thickness and the characteristics (such as magnetic characteristics) of each of the seed layer 12, the under layer 13, and the magnetic recording layer 14 may be controlled, for example, by adjusting a tape line speed for winding the substrate 11, the pressure (sputtering gas pressure) of an Ar gas introduced in sputtering, and an input electric power. The tape line speed is preferably in a range of approximately 1 to 10 m/min. The sputtering gas pressure is preferably in a range of approximately 0.1 to 5 Pa. The input electric power is preferably in a range of approximately 30 to 150 mW/cm$^2$.

3. Method for Manufacturing Magnetic Recording Medium

A magnetic recording medium according to an embodiment of the present technology may be formed, for example, as described below.

First, by the use of the sputtering apparatus shown in FIG. 2, the seed layer 12, the under layer 13, and the magnetic recording layer 14 are formed on the substrate 11. In particular, the film formation is performed as described below. First, the inside of the film formation chamber 21 is vacuumed to a predetermined pressure. Subsequently, while a process gas, such as an Ar gas, is introduced into the film formation chamber 21, the targets set to the cathodes 23a to 23c are sputtered, so that the seed layer 12, the under layer 13, and the magnetic recording layer 14 are sequentially formed on the surface of the substrate 11.

Next, the protective layer 15 is formed on the surface of the magnetic recording layer 14. As a method for forming the protective layer 15, for example, a chemical vapor deposition (CVD) method or a physical vapor deposition (PVD) method may be used.

Next, for example, a lubricant agent is applied on the surface of the protective layer 15 to form the top coat layer

16. As a method for applying a lubricant agent, for example, various application methods, such as gravure coating and dip coating, may be used.

Accordingly, the magnetic recording medium shown in FIG. 1 is obtained.

4. Effects

The magnetic recording medium according to an embodiment has a laminate structure in which the seed layer 12, the under layer 13, and the magnetic recording layer (perpendicular recording layer) 14 having a granular structure are laminated in this order. In addition, the formula F(Ms, α, δ, Rs), the saturated magnetization amount Ms, and the gradient α of a M-H loop around a coercive force Hc satisfy the following relations. Hence, a magnetic recording medium having an excellent SNR can be realized.

$F(Ms,\alpha,\delta,Rs) \leq 0.1$ [μ·emu·(mm)$^{-1.5}$]

$Ms \geq 450$ [emu/cc]

$\alpha \geq 1.2$

While the formula F(Ms, α, δ, Rs), the saturated magnetization amount Ms, and the gradient α of a M-H loop around a coercive force Hc satisfy the relations described above, when the formula f(Ku, V, T) further satisfies the following relation, a magnetic recording medium having an excellent SNR and a high magnetic stability against thermal disturbance can be realized.

$f(Ku,V,T) \geq 65$

When the seed layer 12 which has an amorphous state and which contains a metal having a melting point of 2,000° C. or less is provided between the substrate 11 and the under layer 13, the influence of a O$_2$ gas and/or H$_2$O adsorbed on and in the substrate 11 on the under layer 13 is suppressed, and at the same time, the orientation of the under layer 13 and that of the magnetic recording layer 14 are improved by the metal flat surface formed on the surface of the substrate 11, so that excellent magnetic characteristics can be achieved. Hence, improvement in medium performance, such as increase in output and reduction in noise, can be realized.

5. Modified Example

Figure 3:
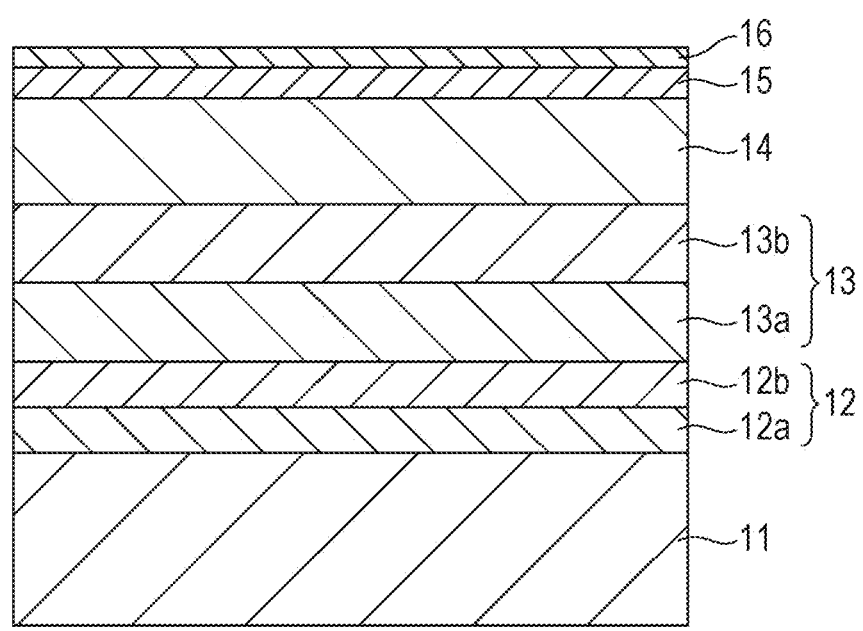
FIG. 3 is a schematic cross-sectional view showing one modified example of the structure of a magnetic recording medium according to an embodiment of the present technology.

In the above embodiment, although the seed layer 12 having a single-layer structure is described by way of example, as shown in FIG. 3, the seed layer 12 may be configured to have a double-layer structure in which a first seed layer (lower-side seed layer) 12a and a second seed layer (upper-side seed layer) 12b are provided. In this case, the first seed layer 12a is provided at a substrate 11 side, and the second seed layer 12b is provided at an under layer 13 side. The first seed layer 12a may be formed from a material similar to that of the seed layer 12 of the above embodiment. The second seed layer 12b contains, for example, a material having a composition different from that of the first seed layer 12a. As a particular example of this material, for example, NiW or Ta may be mentioned. When the seed layer 12 is configured to have a double-layer structure as described above, the orientation of the under layer 13 and that of the magnetic recording layer 14 can be further improved, and hence, the magnetic characteristics can be further improved. In addition, the seed layer 12 may be configured to have a multilayer structure having at least three layers.

In addition, in the above embodiment, although the under layer 13 having a single-layer structure is described by way of example, as shown in FIG. 3, the under layer 13 may be configured to have a double-layer structure in which a first under layer (lower-side under layer) 13a and a second under layer (upper-side under layer) 13b are provided. In this case, the first under layer 13a is provided at a seed layer 12 side, and the second under layer 13b is provided at a magnetic recording layer 14 side. The thickness of the second under layer 13b is preferably larger than that of the first under layer 13a. The reason for this is that the characteristics of the magnetic recording medium can be improved. In addition, the under layer 13 may be configured to have a multilayer structure having at least three layers.

In addition, in the magnetic recording medium described above, although the case in which the formula F(Ms, α, δ, Rs), the saturated magnetization amount Ms, and the gradient α of a M-H loop around a coercive force Hc are set in the respective numerical ranges is described by way of example, the numerical range of the formula F(Ms, α, δ, Rs) may only be set to satisfy F≤0.1 [μ·emu·(mm)$^{-1.5}$]. In the case described above, in order to obtain a high magnetic stability against thermal disturbance, the numerical range of the formula f(Ku, V, T) is also preferably set to satisfy f≥65.

EXAMPLES

Hereinafter, although the present technology will be described with reference to Examples, the present technology is not limited to the following Examples.

(Film Thickness)

In this example, the thickness of each layer laminated on the non-magnetic substrate was measured as described below. First, a magnetic tape was cut in a direction perpendicular to its primary surface, and the cross-section thereof is photographed by a transmission electron microscope (TEM). Next, from a TEM image thus photographed, the thickness of each layer was obtained.

Examples 1-1 to 1-8, and Comparative Examples 1-1 to 1-4

Step of Forming Seed Layer

First, under the following film formation conditions, a TiCr seed layer having a thickness of 5 nm was formed on a high molecular weight film functioning as the non-magnetic substrate.

Sputtering method: DC magnetron sputtering method
Target: TiCr target (however, a TiCr target used in Example 1-2 had a composition different from that of a TiCr target used in Examples 1-1 and 1-3 to 1-8, and Comparative Examples 1-1 to 1-4, and the composition of the TiCr seed layer was changed as shown in Table 1.)
Background pressure: 1.0×10$^{-5}$ Pa
Gas species: Ar
Gas pressure: 0.5 Pa In this specification, the background pressure (BG pressure) indicates a pressure immediately before sputtering is started.

(Step of Forming Under Layer)

Next, under the following film formation conditions, a Ru under layer having a thickness of 20 nm was formed on the TiCr seed layer.

Sputtering method: DC magnetron sputtering method
Target: Ru target
Background pressure: 1.0×10$^{-5}$ Pa Gas species: Ar
Gas pressure: The gas pressure was changed as follows in accordance with each sample.
  Examples 1-1 to 1-6, Comparative Examples 1-1 to 1-3: 1.5 Pa
  Comparative Example 1-4: 0.3 Pa
  Example 1-7: 0.7 Pa
  Example 1-8: 1.0 Pa
(Step of Forming Magnetic Recording Layer)
Next, under the following film formation conditions, a (CoCrPt)—(SiO$_2$) magnetic recording layer having a thickness of 20 nm was formed on the Ru under layer.
  Sputtering method: DC magnetron sputtering method
  Target: (CoCrPt)—(SiO$_2$) target (however, in order to form a magnetic recording layer having the composition shown in Table 1, the composition of the (CoCrPt)—(SiO$_2$) target was adjusted in accordance with each sample.
  Background pressure: $1.0 \times 10^{-5}$ Pa
  Gas species: The gas species to be introduced was changed as follows in accordance with each sample.
    Examples 1-1 to 1-5, 1-7, and 1-8, Comparative Examples 1-1 to 1-4: An Ar gas was only introduced.
    Example 1-6: Besides an Ar gas, a mixed gas containing Ar and O$_2$ (3%) was simultaneously introduced. In addition, the gas flow rate of the mixed gas was set to 5 sccm.
  Gas pressure: The gas pressure was changed as follows in accordance with each sample.
    Examples 1-1 to 1-6, Comparative Examples 1-1 to 1-3: 1.3 Pa
    Examples 1-7 and 1-8, Comparative Example 1-4: 1.5 Pa
(Step of Forming Protective Layer)
Next, under the following film formation conditions, a protective layer having a thickness of 5 nm was formed from carbon on the (CoCrPt)—(SiO$_2$) magnetic recording layer.
  Sputtering method: DC magnetron sputtering method
  Target: carbon target
  Gas species: Ar
  Gas pressure: 1.0 Pa
(Step of Forming Top Coat Layer)
Next, a lubricant agent was applied on the protective layer to form the top coat layer on the protective layer.
Accordingly, a magnetic tape was obtained.

Examples 2-1 to 2-8

The film formation conditions for the step of forming a seed layer were changed as follows. In addition, the gas pressure of the film formation conditions for the magnetic recording layer was changed to 1.5 Pa. A magnetic tape was obtained in a manner similar to that in Example 1-4 except for the changes described above.
  Sputtering method: DC magnetron sputtering method
  Target: The material of the target was changed in Examples 2-1 to 2-3 and Comparative Examples 2-1 to 2-5 so as to form a seed layer containing the material shown in Table 3.
  Background pressure: $1.0 \times 10^{-5}$ Pa
  Gas species: Ar
  Gas pressure: 0.5 Pa Examples 3-1 to 3-5

Except that the film formation conditions for the step of forming a magnetic recording layer were changed as follows, a magnetic tape was obtained in a manner similar to that in Example 1-1.
  Sputtering method: DC magnetron sputtering method
  Target: (CoCrPt)—(SiO$_2$) target (however, the composition of the (CoCrPt)—(SiO$_2$) target was adjusted in accordance with each sample so as to form a magnetic recording layer having the composition shown in Table 1).
  Background pressure: $1.0 \times 10^{-5}$ Pa
  Gas species: The gas species to be introduced was changed as follows in accordance with each sample.
    Examples 3-1 to 3-3: An Ar gas was only introduced.
    Examples 3-4 and 3-5: Besides an Ar gas, a mixed gas containing Ar and O$_2$ (3%) was simultaneously introduced. In addition, in Example 3-4, the gas flow rate of the mixed gas was set to 2.6 sccm, and in Example 3-5, the gas flow rate of the mixed gas was set to 4.0 sccm.
  Gas pressure: 1.5 Pa Example 4

Step of Forming First Seed Layer

First, under the following film formation conditions, as the first seed layer, a TiCr seed layer having a thickness of 10 nm was formed on a high molecular weight film functioning as the non-magnetic substrate.
  Sputtering method: DC magnetron sputtering method
  Target: TiCr target
  Background pressure: $1.0 \times 10^{-5}$ Pa
  Gas species: Ar
  Gas pressure: 0.5 Pa
(Step of Forming Second Seed Layer)
Next, under the following film formation conditions, as the second seed layer, a NiW seed layer having a thickness of 5 nm was formed on the TiCr seed layer.
  Sputtering method: DC magnetron sputtering method
  Target: NiW target
  Background pressure: $1.0 \times 10^{-5}$ Pa
  Gas species: Ar
  Gas pressure: 0.5 Pa
(Step of Forming First Under Layer)
Next, under the following film formation conditions, as the first under layer, a Ru under layer having a thickness of 5 nm was formed on the NiW seed layer.
  Sputtering method: DC magnetron sputtering method
  Target: Ru target
  Background pressure: $1.0 \times 10^{-5}$ Pa
  Gas species: Ar
  Gas pressure: 0.5 Pa
(Step of Forming Second Under Layer)
Next, under the following film formation conditions, as the second under layer, a Ru under layer having a thickness of 25 nm was formed on the Ru under layer functioning as the first under layer.
  Sputtering method: DC magnetron sputtering method
  Target: Ru target
  Background pressure: $1.0 \times 10^{-5}$ Pa
  Gas species: Ar
  Gas pressure: 1.5 Pa
In addition, although the first and the second under layers were both formed from Ru, since the film formation condition (gas pressure) was changed therebetween, the properties of the films were different from each other.
(Step of Forming Magnetic Recording Layer)
Next, under the following film formation conditions, a (CoCrPt)—(SiO$_2$) magnetic recording layer having a thickness of 20 nm was formed on the Ru under layer.

Sputtering method: DC magnetron sputtering method

Target: (CoCrPt)—(SiO$_2$) target (however, the composition of the (CoCrPt)—(SiO$_2$) target was adjusted so as to form a magnetic recording layer having the composition shown in Table 8.)

Background pressure: 1.0×10$^{-5}$ Pa

Gas species: Besides an Ar gas, a mixed gas containing Ar and O$_2$ (3%) was simultaneously introduced. In addition, the gas flow rate of the mixed gas was set to 2.6 sccm.

Gas pressure: 1.5 Pa (Steps of Forming Protective Layer and Top Coat Layer)

Next, the protective layer and the top coat layer were sequentially formed on the (CoCrPt)—(SiO$_2$) magnetic recording layer in a manner similar to that in Example 1-1. As a result, a magnetic tape was obtained.

(Evaluation of Characteristics)

The following evaluations (a) to (h) were performed on the magnetic tape obtained in each of Examples 1-1 to 1-8, 2-1 to 2-8, 3-1 to 3-5, and 4, and Comparative Examples 1-1 to 1-4.

(a) State of Under Layer

The state and the crystalline structure of the under layer were analyzed by examination of the θ/2θ characteristics using an x-ray diffraction apparatus.

(b) State of Seed Layer

By an electron diffraction method, the state and the crystalline structure of the seed layer were analyzed. In addition, in the electron diffraction method, when the seed layer is in a crystalline state, dots are obtained as an electron diffraction image, when the seed layer is in a polycrystalline state, rings are obtained as an electron diffraction image, and when the seed layer is in an amorphous state, a halo is obtained as an electron diffraction image.

(c) Composition of Seed Layer

The composition of the seed layer was analyzed as described below. After the sample was etched from a surface layer thereof with ion beams, the analysis was performed on the outermost surface thus etched by an Auger electron spectroscopy, and the rate of the average atomic number with respect to the thickness was regarded as the rate of the element. In particular, the analysis was performed on three elements, Ti, Cr, and O, and the element content represented by a percentage rate was identified.

Hereinafter, the Auger electron spectroscopy will be described. The auger electron spectroscopy is an analytical method in which by irradiation of a solid surface with narrower electron beams, the energy and the number of generated Auger electrons are measured, so that the type and the quantity of an element present on the solid surface are identified. The energy of an Auger electron thus emitted depends on energy emitted when an electron drops from an outer-shell level to the empty level formed by electron beams irradiated on the surface and has an intrinsic value determined by the element; hence, the element present on the sample surface can be identified.

(d) Composition of Magnetic Recording Layer

The composition of the magnetic recording layer was analyzed as described below. As in the case of the above "(c) composition of seed layer", analysis by an Auger electron spectroscopy was performed, and the rate of the average atomic number with respect to the thickness was regarded as the rate of the element. In particular, the analysis was performed on five elements, Co, Pt, Cr, Si, and O, and the element content represented by a percentage rate was identified.

(e) Magnetic Characteristics of Magnetic Recording Layer

The magnetic characteristics of the magnetic recording layer were evaluated as described below. First, by the use of a vibrating sample magnetometer (VSM), the M-H loop of the magnetic recording layer was obtained. Next, from the M-H loop thus obtained, the saturated magnetization amount Ms, the squareness ratio Rs, the coercive force Hc, and the gradient α of the M-H loop around the coercive force He were obtained. In addition, the measurement was performed in a direction perpendicular to the sample surface, and a so-called demagnetizing field correction by 4πMs based on the sample shape was not performed. Next, besides the saturated magnetization amount Ms, the gradient α, and the squareness Rs, which were obtained as described above, a thickness δ of the magnetic recording layer which was separately obtained was used, so that the value of the formula F(Ms, α, δ, Rs) (=Ms·α·δ$^{1.5}$(1−Rs)$^{0.33}$)) was obtained.

(f) Heat Stability

The heat stability of the magnetic tape was evaluated as described below. First, the magnetic anisotropic energy Ku, the activation volume V, and the absolute temperature T were obtained as described below.

Magnetic Anisotropic Energy Ku

After Ku1 and Ku2 were obtained using a torque magnetometer, by the use of those values, Ku (=Ku1+Ku2) was obtained.

Activation Volume V

After an average grain diameter D of the column was obtained from an in-plane TEM image, the column was approximated as a cylindrical shape, and the activation volume V=π(D/2)$^2$t was obtained. In this case, t indicates the film thickness of the magnetic recording layer.

In addition, it has been apparent that the activation volume of a sputtered CoCr-based film is close to the volume of one column (Reference Literature: by T. Shimazu, H. Uwazumi, H. Muraoka, and Y. Nakamura: Journal of the Magnetics Society of Japan Vol. 26, No. 3, (2002)).

Absolute Temperature T

The absolute temperature T was regarded as 293K (environment at a room temperature of 20° C.).

Next, by the use of the magnetic anisotropy energy Ku, the activation volume V, and the absolute temperature T thus obtained, the value of the formula f(Ku, V, k$_B$) (=(Ku·V/k$_B$·T) was obtained.

(g) Recording/Reproducing Characteristics

The recording/reproducing characteristics were evaluated as described below. First, by the use of a ring type recording head and a giant magnetoresistive (GMR) type reproducing head, recording/reproducing were performed by reciprocating vibration of the head using a piezoelectric stage, that is, measurement was performed by a so-called drag tester. In this measurement, a read track width of the reproducing head was set to 120 nm. Next, a recording wavelength was set to 250 kilo flux changes per inch (kFCI), and the SNR was obtained by calculation using the ratio between a peak-to-peak voltage of a reproduced waveform and a voltage obtained from an integrated value of a noise spectrum from 0 to 500 kFCI.

In general, it is believed that in view of a SNR (so-called digital SNR) which is obtained after waveform equalization and error correction are performed, a minimum SNR necessary to operate a recording/reproducing system is approximately 16 dB. Since the digital SNR is lower than the SNR measured by this measurement method (the above measurement method used for evaluation of recording/reproducing characteristics) by approximately 4 dB, in order to secure a digital SNR of 16 dB, the SNR measured by this measurement method is necessary to be approximately 20 dB. Hence, it is concluded that the SNR by this measurement method is necessary to be at least 20 dB. Furthermore, a SNR margin is preferably further included in consideration of degradation in practical characteristics, such as decrease in output and deformation of the magnetic tape, generated by sliding between the magnetic tape and the magnetic head. When the margin described above is taken into consideration, it is believed that the SNR is preferably set to 23 dB or more.

In addition, in the magnetic tape of each Example, when a linear recording density is 500 kilo bit per inch (kBPI), and a track density is 106 kilo tacks per inch (kTPI) assuming that the track pitch is two times the track width of the reproducing head, a surface recording density of 53 Gb/in (500 kBPI×106 kTPI) can be realized.

(h) Output Attenuation

Output attenuation was evaluated as described below. First, as in the above "(f) recording/reproducing characteristics", the SNR of a magnetic tape was obtained as initial characteristics. Next, the magnetic tape, the SNR of which was obtained as described above, was maintained at room temperature for 100 hours, and the SNR of the magnetic tape was again obtained. Next, from the following formula, the output attenuation of the magnetic tape was obtained.

(Output Attenuation)=(Initial SNR)−(SNR obtained after 100 hours)

(Evaluation Results)

Table 1 shows the film formation conditions and the layer structure of the magnetic tape of each of Examples 1-1 to 1-8 and Comparative Examples 1-1 to 1-4.

TABLE 1

| | Seed Layer | | | | | | | Under Layer |
|---|---|---|---|---|---|---|---|---|
| | | Composition | | | | | | |
| | Gas | | Rate | | | Oxidation | Film | Gas |
| | Pressure | | Ti | Cr | | Degree | Thickness | Pressure | |
| | [Pa] | Material | [at. %] | [at. %] | State | [at. %] | [nm] | [Pa] | Material |
| Comparative Example 1-1 | 0.5 | TiCr | 50 | 50 | Amp | 10 | 5 | 1.5 | Ru |
| Comparative Example 1-2 | 0.5 | TiCr | 50 | 50 | Amp | 10 | 5 | 1.5 | Ru |
| Example 1-1 | 0.5 | TiCr | 50 | 50 | Amp | 10 | 5 | 1.5 | Ru |
| Example 1-2 | 0.5 | TiCr | 30 | 70 | Amp | 10 | 5 | 1.5 | Ru |
| Example 1-3 | 0.5 | TiCr | 50 | 50 | Amp | 10 | 5 | 1.5 | Ru |
| Example 1-4 | 0.5 | TiCr | 50 | 50 | Amp | 10 | 5 | 1.5 | Ru |
| Comparative Example 1-3 | 0.5 | TiCr | 50 | 50 | Amp | 10 | 5 | 1.5 | Ru |
| Example 1-5 | 0.5 | TiCr | 50 | 50 | Amp | 10 | 5 | 1.5 | Ru |
| Example 1-6 | 0.5 | TiCr | 50 | 50 | Amp | 10 | 5 | 1.5 | Ru |
| Comparative Example 1-4 | 0.5 | TiCr | 50 | 50 | Amp | 10 | 5 | 0.3 | Ru |
| Example 1-7 | 0.5 | TiCr | 50 | 50 | Amp | 10 | 5 | 0.7 | Ru |
| Example 1-8 | 0.5 | TiCr | 50 | 50 | Amp | 10 | 5 | 1.0 | Ru |

| | Under Layer | | Magnetic Recording Layer | | | | | | | |
|---|---|---|---|---|---|---|---|---|---|---|
| | | Film | Gas | (Ar + $O_2$) | | Composition Rate | | | | Film Thickness |
| | State | Thickness [nm] | Pressure [Pa] | Gas Species | Flow Rate [sccm] | Co [at. %] | Pt [at. %] | Cr [at. %] | $SiO_2$ [at. %] | δ [nm] |
| Comparative Example 1-1 | hcp | 20 | 1.3 | Ar | 0 | 70 | 14 | 9 | 7 | 20 |
| Comparative Example 1-2 | hcp | 20 | 1.3 | Ar | 0 | 72 | 14 | 7 | 7 | 20 |
| Example 1-1 | hcp | 20 | 1.3 | Ar | 0 | 70 | 14 | 8 | 8 | 20 |
| Example 1-2 | hcp | 20 | 1.3 | Ar | 0 | 67.5 | 13.5 | 9 | 10 | 20 |
| Example 1-3 | hcp | 20 | 1.3 | Ar | 0 | 67.5 | 13.5 | 9 | 10 | 20 |
| Example 1-4 | hcp | 20 | 1.3 | Ar | 0 | 63 | 13.5 | 13.5 | 10 | 20 |
| Comparative Example 1-3 | hcp | 20 | 1.3 | Ar | 0 | 56.5 | 13.1 | 17.4 | 13 | 20 |
| Example 1-5 | hcp | 20 | 1.3 | Ar | 0 | 58.5 | 13.5 | 18 | 10 | 20 |
| Example 1-6 | hcp | 20 | 1.3 | Ar, Ar + $O_2$ | 5 | 63 | 14.5 | 12.5 | 12 | 20 |
| Comparative Example 1-4 | hcp | 20 | 1.5 | Ar | 0 | 63 | 13.5 | 13.5 | 10 | 20 |
| Example 1-7 | hcp | 20 | 1.5 | Ar | 0 | 63 | 13.5 | 13.5 | 10 | 20 |
| Example 1-8 | hcp | 20 | 1.5 | Ar | 0 | 63 | 13.5 | 13.5 | 10 | 20 |

Amp: Amorphous
Background pressure: $1.0 \times 10^{-5}$ [Pa] (for the seed layer, the under layer, and the magnetic recording layer)
Seed layer: melting point of Ti/1,666° C., melting point of Cr/1,857° C.

Table 2 shows the evaluation results of the magnetic tape of each of Examples 1-1 to 1-8 and Comparative Examples 1-1 to 1-4.

TABLE 2

| | Hc [Oe] | Ms [emu/cc] | α | Rs | Msαδ$^{1.5}$(1-Rs)$^{0.33}$ [μ · emu · (mm)$^{-1.5}$] | Ku [erg/cc] | V [nm$^3$] | KuV/kbT | SNR [dB] | Output Attenuation 100 H [dB] |
|---|---|---|---|---|---|---|---|---|---|---|
| Comparative Example 1-1 | 3500 | 850 | 2.7 | 0.85 | 0.109 | — | — | — | 17 | — |
| Comparative Example 1-2 | 3200 | 900 | 3.2 | 0.85 | 0.137 | — | — | — | 12 | — |
| Example 1-1 | 3600 | 800 | 2.5 | 0.85 | 0.095 | — | — | — | 20 | — |
| Example 1-2 | 4000 | 750 | 2.2 | 0.8 | 0.086 | 5.70 × 10$^6$ | 500 | 70 | 21 | 0.5 |
| Example 1-3 | 4500 | 750 | 2.1 | 0.85 | 0.075 | 5.70 × 10$^6$ | 500 | 70 | 24 | 0.5 |
| Example 1-4 | 4500 | 600 | 2 | 0.85 | 0.057 | 5.30 × 10$^6$ | 500 | 65 | 25 | 1.0 |
| Comparative Example 1-3 | 3300 | 400 | 1.5 | 0.75 | 0.034 | — | — | — | 19 | — |
| Example 1-5 | 3500 | 450 | 1.7 | 0.8 | 0.040 | — | — | — | 23 | — |
| Example 1-6 | 4000 | 500 | 1.9 | 0.8 | 0.050 | — | — | — | 25 | — |
| Comparative Example 1-4 | 3600 | 600 | 1.1 | 0.6 | 0.043 | — | — | — | 19 | — |
| Example 1-7 | 3700 | 600 | 1.2 | 0.7 | 0.043 | — | — | — | 23 | — |
| Example 1-8 | 4000 | 600 | 1.5 | 0.8 | 0.047 | — | — | — | 23 | — |

Table 3 shows the film formation conditions and the layer structure of Examples 2-1 to 2-8.

TABLE 3

| | Seed Layer | | | | | | | Under Layer | |
|---|---|---|---|---|---|---|---|---|---|
| | Gas Pressure [Pa] | Material | Melting Point [° C.] | Composition Rate [at. %] | State | Oxidation Degree [at. %] | Film Thickness [nm] | Gas Pressure [Pa] | Material |
| Example 2-1 | 0.5 | Ta | 2985 | Ta = 100 | — | — | 5 | 1.5 | Ru |
| Example 2-2 | 0.5 | W | 3407 | W = 100 | — | — | 5 | 1.5 | Ru |
| Example 2-3 | 0.5 | Mo | 2623 | Mo = 100 | — | — | 5 | 1.5 | Ru |
| Example 2-4 | 0.5 | TiMo | Ti: 1666 Mo: 2623 | TiMo = 95:5 | — | — | 5 | 1.5 | Ru |
| Example 2-5 | 0.5 | NiW | Ni: 1455 W: 3407 | NiW = 95:5 | — | — | 5 | 1.5 | Ru |
| Example 2-6 | 0.5 | Ti | 1666 | Ti = 100 | Amp | 10 | 5 | 1.5 | Ru |
| Example 2-7 | 0.5 | NiAl | Ni: 1455 Al: 660.4 | Ni:Al = 50:50 | — | 10 | 5 | 1.5 | Ru |
| Example 2-8 | 0.5 | CoCr | Co: 1495 Cr: 1857 | Co:Cr = 70:30 | — | 10 | 5 | 1.5 | Ru |

| | Under Layer | | Magnetic Recording Layer | | | | | Film Thickness |
|---|---|---|---|---|---|---|---|---|
| | State | Film Thickness [nm] | Gas Pressure [Pa] | Gas Species | Co [at. %] | Pt [at. %] | Cr [at. %] | SiO$_2$ [at. %] | δ [nm] |
| Example 2-1 | hcp | 20 | 1.5 | Ar | 63 | 13.5 | 13.5 | 10 | 20 |
| Example 2-2 | hcp | 20 | 1.5 | Ar | 63 | 13.5 | 13.5 | 10 | 20 |
| Example 2-3 | hcp | 20 | 1.5 | Ar | 63 | 13.5 | 13.5 | 10 | 20 |
| Example 2-4 | hcp | 20 | 1.5 | Ar | 63 | 13.5 | 13.5 | 10 | 20 |
| Example 2-5 | hcp | 20 | 1.5 | Ar | 63 | 13.5 | 13.5 | 10 | 20 |

TABLE 3-continued

| | | | | | | | | | |
|---|---|---|---|---|---|---|---|---|---|
| Example 2-6 | hcp | 20 | 1.5 | Ar | 63 | 13.5 | 13.5 | 10 | 20 |
| Example 2-7 | hcp | 20 | 1.5 | Ar | 63 | 13.5 | 13.5 | 10 | 20 |
| Example 2-8 | hcp | 20 | 1.5 | Ar | 63 | 13.5 | 13.5 | 10 | 20 |

Amp: Amorphous
Background pressure: $1.0 \times 10^{-5}$ [Pa] (for the seed layer, the under layer, and the magnetic recording layer)

Table 4 shows the evaluation results of the magnetic tape of each of Examples 2-1 to 2-8.

TABLE 4

| | Hc [Oe] | Rs |
|---|---|---|
| Example 2-1 | 3500 | 0.65 |
| Example 2-2 | 3500 | 0.6 |
| Example 2-3 | 3000 | 0.5 |
| Example 2-4 | 3500 | 0.65 |
| Example 2-5 | 3500 | 0.63 |
| Example 2-6 | 4500 | 0.85 |
| Example 2-7 | 4000 | 0.82 |
| Example 2-8 | 3800 | 0.78 |

Table 5 shows the film formation conditions and the layer structure of the magnetic tape of each of Examples 3-1 to 3-5.

TABLE 5

| | Seed Layer | | | | | | | Under Layer |
|---|---|---|---|---|---|---|---|---|
| | | | Composition | | | | | |
| | | | Rate | | Oxidation | Film | | |
| | Gas Pressure [Pa] | Material | Ti [at. %] | Cr [at. %] | State | Degree [at. %] | Thickness [nm] | Gas Pressure [Pa] | Material |
| Example 3-1 | 0.5 | TiCr | 50 | 50 | Amp | 10 | 5 | 1.5 | Ru |
| Example 3-2 | 0.5 | TiCr | 50 | 50 | Amp | 10 | 5 | 1.5 | Ru |
| Example 3-3 | 0.5 | TiCr | 50 | 50 | Amp | 10 | 5 | 1.5 | Ru |
| Example 3-4 | 0.5 | TiCr | 50 | 50 | Amp | 10 | 5 | 1.5 | Ru |
| Example 3-5 | 0.5 | TiCr | 50 | 50 | Amp | 10 | 5 | 1.5 | Ru |

| | Under Layer | | Magnetic Recording Layer | | | | | | Film |
|---|---|---|---|---|---|---|---|---|---|
| | | | | ($Ar + O_2$) | | | | | |
| | | Film Thickness [nm] | Gas Pressure [Pa] | Gas Species | Flow Rate [sccm] | Co [at. %] | Pt [at. %] | Cr [at. %] | $SiO_2$ [at. %] | Thickness $\delta$ [nm] |
| | State | | | | | | | | | |
| Example 3-1 | hcp | 20 | 1.5 | Ar | 0 | 63 | 14.5 | 12.5 | 12 | 10 |
| Example 3-2 | hcp | 20 | 1.5 | Ar | 0 | 63 | 14.5 | 12.5 | 12 | 15 |
| Example 3-3 | hcp | 20 | 1.5 | Ar | 0 | 58.5 | 13.5 | 18 | 10 | 20 |
| Example 3-4 | hcp | 20 | 1.5 | Ar, Ar + $O_2$ | 2.6 | 69 | 13.8 | 9.2 | 8 | 20 |
| Example 3-5 | hcp | 20 | 1.5 | Ar, Ar + $O_2$ | 4.0 | 69 | 13.8 | 9.2 | 8 | 20 |

Amp: Amorphous
Background pressure: $1.0 \times 10^{-5}$ [Pa] (for the seed layer, the under layer, and the magnetic recording layer)
Seed layer: melting point of Ti/1,666° C., melting point of Cr/1,857° C.

Table 6 shows the evaluation results of the magnetic tape of each of Examples 3-1 to 3-5.

TABLE 6

| | Hc [Oe] | Ms [emu/cc] | α | Rs | Msαδ$^{1.5}$(1-Rs)$^{0.33}$ [μ·emu·(mm)$^{-1.5}$] | Ku [erg/cc] | V [nm$^3$] | KuV/kbT | SNR [dB] | Output Attenuation 100 H [dB] |
|---|---|---|---|---|---|---|---|---|---|---|
| Example 3-1 | 4000 | 600 | 2.2 | 0.85 | 0.022 | 5.45 × 10$^6$ | 263 | 35.5 | 24 | 4 |
| Example 3-2 | 4300 | 600 | 2.1 | 0.85 | 0.039 | 5.45 × 10$^6$ | 395 | 53.5 | 25 | 2 |
| Example 3-3 | 3800 | 450 | 1.7 | 0.8 | 0.040 | 4.10 × 10$^6$ | 500 | 46 | 24 | 2.5 |
| Example 3-4 | 4500 | 650 | 2.1 | 0.85 | 0.065 | 5.50 × 10$^6$ | 482 | 65 | 25 | 1.0 |
| Example 3-5 | 4500 | 750 | 1.9 | 0.88 | 0.063 | 5.70 × 10$^6$ | 470 | 66 | 24 | 0.8 |

Tables 7 and 8 show the film formation conditions and the layer structure of the magnetic tape of Example 4.

TABLE 7

| | First Seed Layer (Lower Side) | | | | | | | Second Seed Layer (Upper Side) | | | | | | |
|---|---|---|---|---|---|---|---|---|---|---|---|---|---|---|
| | Gas Pressure [Pa] | Material | Melting Point [°C.] | Composition Rate Ti [at. %] | Composition Rate Cr [at. %] | State | Oxidation Degree [at. %] | Film Thickness [nm] | Gas Pressure [Pa] | Material | Melting Point [°C.] | Composition Rate Ni [at. %] | Composition Rate W [at. %] | State | Film Thickness [nm] |
| Example 4 | 0.5 | TiCr | Ti: 1666 Cr: 1857 | 50 | 50 | Amp | 10 | 5 | 0,5 | NiW | Ni: 1455 W: 3407 | 94 | 6 | fcc | 10 |

Amp: Amorphous
Background pressure: 1.0 × 10$^{-5}$ [Pa] (for the first seed layer and the second seed layer)

TABLE 8

| | First Under Layer (Lower Side) | | | | Second Under Layer (Upper Side) | | | | Magnetic Recording Layer | | | | | | | |
|---|---|---|---|---|---|---|---|---|---|---|---|---|---|---|---|---|
| | Gas Pressure [Pa] | Material | State | Film Thickness [nm] | Gas Pressure [Pa] | Material | State | Film Thickness [nm] | Gas Pressure [Pa] | Gas Species | Ar + O$_2$ Flow Rate [sccm] | Co [at. %] | Pt [at. %] | Cr [at. %] | SiO$_2$ [at. %] | Film Thickness δ [nm] |
| Example 4 | 0.5 | Ru | hcp | 5 | 1.5 | Ru | hcp | 25 | 1.5 | Ar, Ar + O$_2$ | 2.6 | 63 | 13.5 | 13.5 | 10 | 20 |

Background pressure: 1.0 × 10$^{-5}$ [Pa] (for the first under layer, the second under layer, and the magnetic recording layer)

Table 9 shows the evaluation results of the magnetic tape of Example 4.

TABLE 9

| | Hc [Oe] | Ms [emu/cc] | α | Rs | Msαδ$^{1.6}$(1-Rs)$^{0.33}$ [μ·emu·(mm)$^{-1.5}$] | Ku [erg/cc] | V [nm$^3$] | KuV/kbT | SNR [dB] | Output Attenuation 100 H [dB] |
|---|---|---|---|---|---|---|---|---|---|---|
| Example 4 | 5000 | 600 | 1.8 | 0.9 | 0.045 | 5.30 × 106 | 550 | 72 | 26 | 0.4 |

Figure 4A:
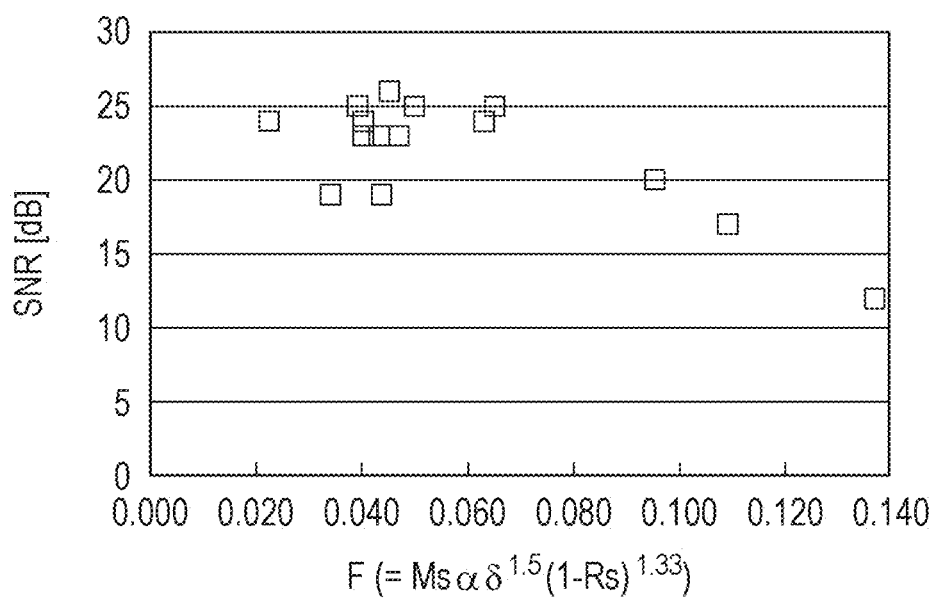
FIG. 4A is a graph showing the relationship between a SNR and formula $F(=(Ms \cdot \alpha \cdot \delta^{1.5}(1-Rs)^{0.33}))$.
Figure 4B:
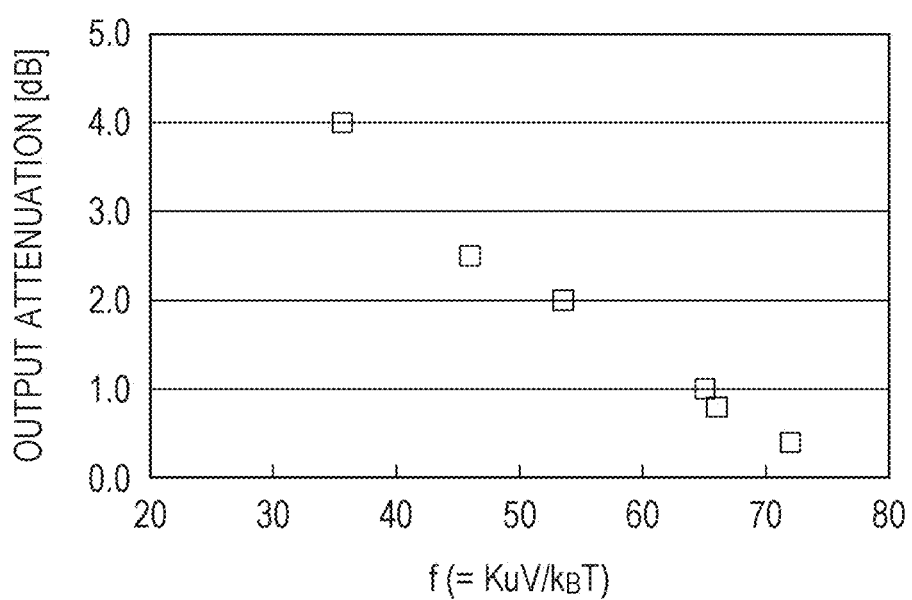
FIG. 4B is a graph showing the relationship between output attenuation and formula $f(=Ku \cdot V/k_B \cdot T)$.

From Tables 1 to 9 and FIGS. 4A and 4B, the following is understood.

When the formula F(Ms, α, δ, Rs), the saturated magnetization amount Ms, and the gradient α of a M-H loop around a coercive force Hc satisfy F(Ms, α, δ, Rs)≤0.1 [μ·emu·(mm)$^{-1.5}$], Ms≥450 [emu/cc], and α≥1.2, the SNR can be set to 20 dB or more.

When the formula F(Ms, α, δ, Rs), the saturated magnetization amount Ms, and the gradient α of a M-H loop around a coercive force Hc satisfy the above relations, and in addition, when the formula f(Ku, V, k$_B$) is also set to satisfy f(Ku, V, k$_B$)≥65, the output attenuation can be set to 1.0 dB or less.

The expression of the above effect is not limited to the case in which a TiCr alloy is used as the material of the seed layer. When a metal having a melting point of 2,000° C. or less is used as the material of the seed layer, and in addition, when F, Ms, and a or F, Ms, α and f satisfy the above relations, it is believed that an effect similar to that described above can be obtained. As the metal having a melting point of 2,000° C. or less, for example, besides a TiCr alloy, a Ti element, a NiAl alloy, or a CoCr alloy may also be used.

When the seed layer and the under layer each have a laminate structure, and F, Ms, and α or F, Ms, α and f satisfy the above relations, a more excellent effect can be obtained.

When the evaluation results of Comparative Example 1-3 are compared to those of Example 1-5 (see Table 2), it is found that in order to realize a target SNR (≥20 [dB]), the formula F and the saturated magnetization amount Ms are necessarily set to satisfy F≤0.1 [μ·emu·(mm)$^{-1.5}$] and Ms≥450 [emu/cc], respectively.

When the evaluation results of Comparative Example 1-4 are compared to those of Example 1-7 (see Table 2), it is found that in order to realize a target SNR (≥20 [dB]), the formula F and the saturated magnetization amount Ms are necessarily set to satisfy F≤0.1 [μ·emu·(mm)$^{-1.5}$] and Ms≥450 [emu/cc], respectively, and furthermore, the gradient α is necessarily set to satisfy α≥1.2.

From the evaluation results of the output attenuation of Examples 1-2 to 1-4, it is found that in order to sufficiently withstand the influence of thermal disturbance, $Ku·V/k_B·T$≥65 is preferably satisfied.

From the evaluation results (evaluation results of Rs) shown in Table 4, it is found that when a metal having a melting point of 2,000° C. or less is used as the material of the seed layer, the perpendicular orientation of the under layer and that of the magnetic recording layer are improved. In addition, in order to realize a high SNR, Rs is preferably 0.7 (70%) or more.

Heretofore, although the embodiments of the present technology have been described in detail, the present technology is not limited to the embodiments described above and may be variously changed and modified without departing from the technical scope of the present technology.

For example, the structure, the method, the step, the shape, the material, the numeral, and the like described in the above embodiments are merely shown by way of example, and if necessary, different structure, method, step, shape, material, numeral, and the like may also be used.

In addition, the structure, the method, the step, the shape, the material, the numeral, and the like described in the above embodiments may be used in combination without departing from the scope of the present technology.

In addition, according to an embodiment of the present technology, the following structures may also be employed.
(1) A magnetic recording medium includes: a substrate; a seed layer; an under layer; and a perpendicular recording layer having a granular structure, and $(Ms·α·δ^{1.5}(1-Rs)^{0.33})$, Ms, and α satisfy the following relations.

$$(Ms·α·δ^{1.5}(1-Rs)^{0.33})≤0.1 \ [μ·emu·(mm)^{-1.5}],$$

$$Ms≥450 \ [emu/cc]$$

$$α≥1.2$$

(In the above formulas, Ms indicates a saturated magnetization amount, α indicates the gradient of a M-H loop around a coercive force Hc, δ indicates the thickness of the perpendicular recording layer, and Rs indicates a squareness ratio.)
(2) In the magnetic recording medium of the above (1), the seed layer has an amorphous state and includes a metal having a melting point of 2,000° C. or less.
(3) In the magnetic recording medium of the above (1) or (2), the seed layer has an amorphous state and includes an alloy containing Ti and Cr.

(4) In the magnetic recording medium of one of the above (1) to (3), $(Ku·V/k_B·T)$ satisfies the following relation.

$$(Ku·V/k_B·T)≥65$$

(In the above formula, Ku indicates magnetic anisotropy energy, V indicates an activation volume, $k_B$ indicates Boltzmann constant, and T indicates the absolute temperature.)
(5) In the magnetic recording medium of one of the above (1) to (4), the under layer includes Ru.
(6) In the magnetic recording medium of one the above (1) to (5), the perpendicular recording layer has a granular structure in which grains containing Co, Pt, and Cr are separated from each other with oxides provided therebetween.
(7) In the magnetic recording medium of the above (6), the perpendicular recording layer has an average composition represented by the following formula (1).

$$(Co_xPt_yCr_{100-x-y})_{100-z}—(SiO_2)_z \quad (1)$$

(In the formula (1), x, y, and z satisfy 69≤x≤72, 12≤y≤16, 9≤z≤12, respectively.)
(8) In the magnetic recording medium of one of the above (1) to (7), the substrate is a flexible non-magnetic substrate.

It should be understood by those skilled in the art that various modifications, combinations, sub-combinations and alterations may occur depending on design requirements and other factors insofar as they are within the scope of the appended claims or the equivalents thereof.

What is claimed is:
1. A magnetic recording tape comprising:
   a substrate that is selected from the group consisting of polyester, a cellulose derivative, a vinyl-based resin, a polyimide, and a polyamide;
   a seed layer having an amorphous state and including an alloy containing Ti and Cr, wherein the seed layer contacts the substrate;
   an under layer including Ru, wherein the seed layer is between the substrate and the under layer, and wherein the seed layer suppresses an influence of $O_2$ and $H_2O$ adsorbed on the substrate and improves a crystalline orientation of the under layer; and
   a perpendicular recording layer having a granular structure formed on the under layer,
   wherein $(Ms·α·δ^{1.5}(1-Rs)^{0.33})$, Ms, and α satisfy the following relations:

$$(Ms·α·δ^{1.5}(1-Rs)^{0.33})≤0.1 \ [μ·emu·(mm)^{-1.5}]$$

$$Ms≥450 \ [emu/cc]$$

$$α≥1.2$$

wherein in the above formulas, Ms indicates a saturated magnetization amount, α indicates the gradient of a M-H loop around a coercive force Hc, δ indicates the thickness of the perpendicular recording layer, and Rs indicates a squareness ratio.
2. The magnetic recording tape according to claim 1, wherein the seed layer has an amorphous state and includes a metal having a melting point of 2,000° C. or less.
3. The magnetic recording tape according to claim 1, wherein $(Ku·V/k_B·T)$ satisfies the following relation:

$$(Ku·V/k_B·T)≥65, \text{ and}$$

wherein in the above formula, Ku indicates magnetic anisotropy energy, V indicates an activation volume, $k_B$ indicates Boltzmann constant, and T indicates the absolute temperature.

4. The magnetic recording tape according to claim 1, wherein the perpendicular recording layer has a granular structure in which grains containing Co, Pt, and Cr are separated from each other with oxides provided therebetween.

5. The magnetic recording tape according to claim 4, wherein the perpendicular recording layer has an average composition represented by the following formula (1):

$(Co_xPt_yCr_{100-x-y})_{100-z}—(SiO_2)_z$      (1), and wherein in the formula (1), x, y, and z satisfy $69 \leq x \leq 72$, $12 \leq y \leq 16$, and $9 \leq z \leq 12$, respectively.

6. The magnetic recording tape according to claim 1, wherein a thickness of the magnetic recording tape is between 5 nm and 20 nm.

7. The magnetic recording tape according to claim 1, wherein the seed layer includes an alloy containing Ti, Cr, and O.

8. The magnetic recording tape according to claim 7, wherein the seed layer further contains 15 atomic % or less of O and more than 0 atomic % of O.

9. The magnetic recording tape according to claim 1, wherein the seed layer contains at least 30 atomic % of Ti.

10. The magnetic recording tape according to claim 1, wherein the under layer has a crystalline structure similar to that of the perpendicular recording layer.

11. The magnetic recording tape according to claim 1, wherein the under layer is a Ru element or a Ru alloy.

12. The magnetic recording tape according to claim 11, wherein the Ru alloy is a Ru alloy oxide.

13. The magnetic recording tape according to claim 11, wherein the Ru alloy is Ru—$SiO_2$, Ru—$TiO_2$, or Ru—$ZrO_2$.

14. The magnetic recording tape according to claim 1, wherein the seed layer comprises oxygen.

15. The magnetic recording tape according to claim 14, wherein the seed layer contains 15 atomic % or less of oxygen and more than 0 atomic % of O.

* * * * *